R. S. Eddy,
Horse Power.
No. 77,015. Patented Apr. 21, 1868.
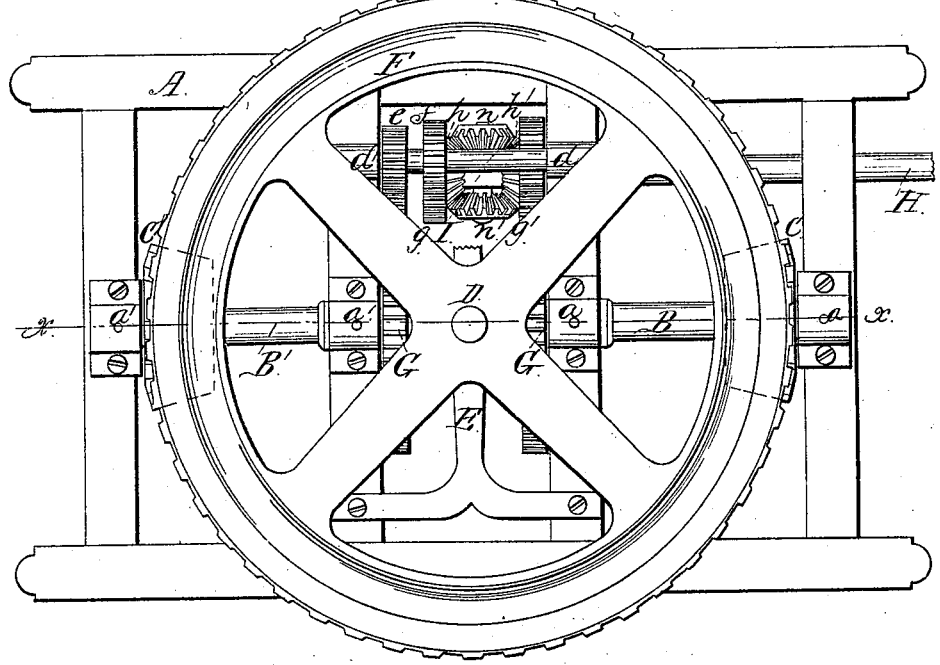
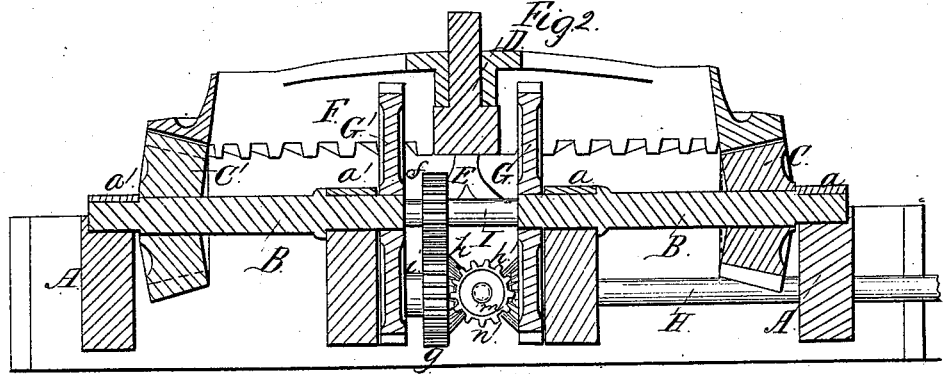
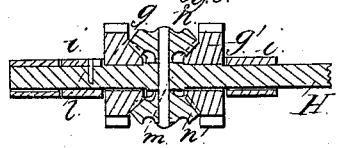
Witnesses:
J. T. Dodge
John Drury
Inventor
R. S. Eddy
by Dodge & Munn
his attorneys

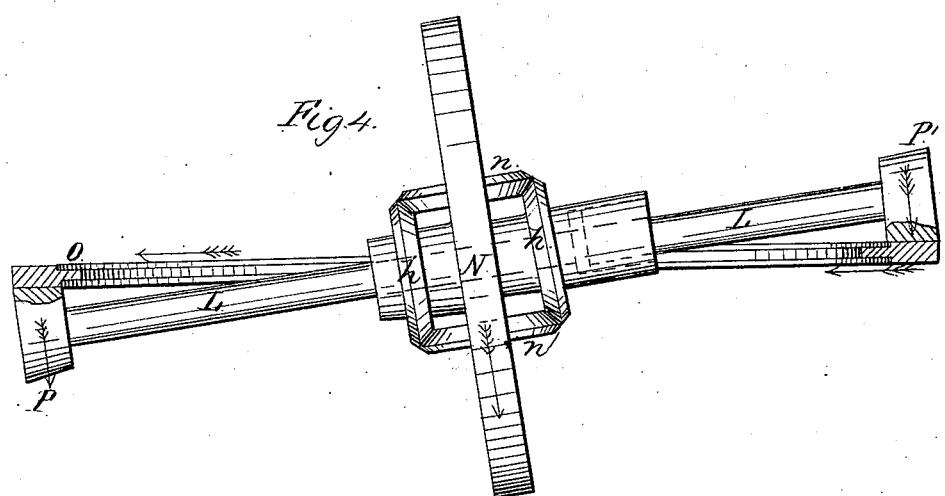
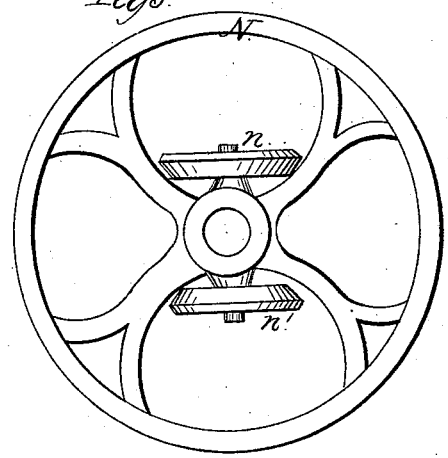
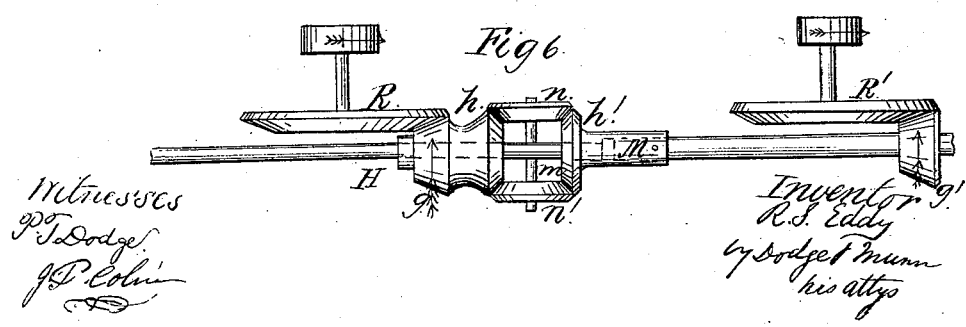

United States Patent Office.

ROLLIN S. EDDY, OF LA CROSSE, WISCONSIN, ASSIGNOR TO HIMSELF, W. H. SMITH, SETH DEAN, AND HENRY MERRILL.

Letters Patent No. 77,015, dated April 21, 1868.

IMPROVEMENT IN HORSE-POWERS.

The Schedule referred to in these Letters Patent and making part of the same.

TO ALL WHOM IT MAY CONCERN:

Be it known that I, ROLLIN S. EDDY, of La Crosse, in the county of La Crosse, and State of Wisconsin, have invented certain new and useful Improvements in Horse-Powers; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to horse-powers, and consists of novel construction and arrangement of mechanical devices for distributing and equalizing the strain throughout the gearing, and by the use of which the power may be easily taken apart for repairs or other purposes, and readily put together again. In the drawings—

Figure 1 is a top plan view, with a portion of the support E broken away.

Figure 2 is a transverse vertical section of fig. 1.

Figure 3 is a longitudinal section of a part, detached; and

Figures 4, 5, and 6 represent the application of my device to what are popularly known as the Pitts or Carey power and the Woodbury power.

I construct a strong, substantial frame, A, and mount therein the two shafts B B' in suitable bearings, $a a'$, and so that they shall be in a straight line with each other, as shown in fig. 1. To the shafts B B' I key the bevel-gear wheels C C', just within their outer bearings, and on their ends, which are immediately opposite each other, I key the spur-wheels G G', as shown in figs. 1 and 2. Across the middle of the frame A, I place a strong support, E, a little arched or circling, as shown in fig. 1, and with its legs firmly attached to the frame, and provided at its centre with an upright journal or pin, D, as clearly shown in fig. 2. On the journal D, I place a driving-wheel, F, so as to move easily about it. The driving-wheel F, I provide with bevel-gear on the under side of its periphery, and of the proper size to allow it to gear into the bevel-wheels C C'. Also, in the frame A, I mount a smaller shaft, I, in bearings, $d d'$, and to this shaft key two spur-pinions, $e f$, arranging them as shown in fig. 1, and so that the wheel G' shall gear into the pinion $e$, and the pinion $f$ into the spur-wheel $g$ immediately under it.

Besides the shafts B, B', and I, the former of which are on a line with one another, and the latter parallel with them, I mount in the frame A the line-shaft H, under the shaft I, and parallel with it, and on it place two loose spur-wheels, $g g'$, arranged and held in place by the collars $i$, so that the pinion $f$ shall gear into the wheel $g$, and the wheel G into the wheel $g'$. The collars $i$ are pinned to the shaft H by pin $l$, as shown in fig. 3.

On the inner opposing faces of the wheels $g g'$, I place bevel-gearing $h h$, which may be a part of the wheels $g g'$, or may be bevel-gear wheels rigidly attached, and on each end of a pin, $m$, passing through the shaft H, and rigidly attached to it, and midway between the wheels $g g'$, I place the bevel-wheels $n n'$, so as to move loosely on the pin $m$, and gear into the bevel-gear $h h'$, attached to the wheels $g g'$.

In operating my "horse-power," it will be seen that the driving-wheel F, acting on the loose wheel $g$, through the wheels C', G', $e$, and $f$, and on the wheel $g'$ through the wheels C and G, will cause the wheels $g$ and $g'$ to revolve in the same direction, and carry with them the wheels $h$ and $h'$, which in turn will carry with them the bevel-wheels $n$ and $n'$, and thus turn the line-shaft H as desired. And as by this arrangement the wheels $g g'$, and $h h'$, and $n n'$, and the collars $i$, which hold the wheels $g g'$ in position, all move together in the same direction when the machine is in operation, very much of the friction and jar caused by the thrusting of the gearing are avoided and diminished. And in case any portion of the machine while running should be broken by accident or otherwise, so that the wheels $g g'$ should not or could not move evenly together, the bevel-wheels $n n'$ will at once adapt them to every change they may make, and thus equalize their uneven movements, if any.

In the drawings I have shown the application of my devices in what is popularly known as the "climax-power," but I also apply it with similar advantages in what is known as the "Pitts" or "Carey" and the Woodbury power, as shown in figs. 4, 5, and 6.

My device, as applied to the "Woodbury mounted power," for distributing and equalizing the strain throughout the gearing, is shown in figs. 4 and 5. In fig. 4, N is the open ring or master-wheel, having no arms, but being simply a ring with teeth on the top and bottom sides, which mesh into pinions, P P', one in the top, and the other in the bottom of the wheel N, and cause the shafts L and L', to which these pinions are attached, to move with equal velocity in the same direction, as denoted by the red arrows on the pinions P P'. The bevel-wheels $h\ h'$, in this case, are keyed fast to the shafts L L' respectively. The bevel-wheels $n\ n'$ run upon projections cast upon the spur-wheel N, or any equivalent of the same, instead of upon a pin passing through the line-shaft, as in figs. 1, 2, and 3. The spur-wheel N runs loosely on the shaft L, and the wheels $n$ and $n'$ also run loosely on their bearings. The whole are held in place by a head or collar at M, which serves the same purpose that collars $i\ i$ do in figs. 1, 2, and 3.

In operating this power with my device thus applied, I give motion to the master-wheel N, which turns the pinions P P' in the direction shown by the red arrows, with their shafts L L', and which in turn give motion to the spur-wheel N through the wheels $h\ h'$ and $n\ n'$. It will thus be seen that if from any cause either of the pinions P or P' should be inclined to receive the hardest strain of the wheels $h$ and $h'$ turning independent of the shafts L and L', the strain through the wheels $h\ h'$ and $n\ n'$ will be equally distributed or divided to every wheel in the power, as in the arrangement first described.

The manner of applying my device to the Pitts or Carey power, popularly so termed, is clearly shown in fig. 6, in which the bevel-wheels $h\ h'$ turn loosely on the line-shaft H, and are connected with and revolved by the bevel-wheels $g\ g'$, the bevel-wheel $g$ being moved by the bevel-wheel R, and the bevel-wheel $g'$ by the bevel-wheel R'. The whole are held in by a collar at M. By this arrangement, as in those above described, the strain is equalized and distributed evenly in the gear of the power.

In these modifications, shown in figs. 4, 5, and 6, it is obvious that my device will distribute and equalize the strain on the gear, diminish the friction and jar caused by the thrusting of the gearing as effectually as in what is popularly described and known as the climax-power, first above particularly set forth.

Having thus described my invention, what I claim, is—

1. In a horse-power, the bevel-wheels $h\ h'$ and $n\ n'$, or their equivalents, when constructed and arranged as described, for the purpose of distributing and equalizing the strain throughout the gearing.

2. The pin $m$, and collars $i$, or their equivalents, when constructed and arranged substantially as herein described, and for the purpose set forth.

3. The wheels $h\ h'$ and $n\ n'$, arranged as herein described, on a shaft, H, and held in place by a collar on the shaft, in combination with the shaft or with a master-wheel, N, in a horse-power, substantially as described, and for the purpose set forth.

4. The use of a device for equalizing the strain in horse-powers, consisting of two bevel-wheels, $h\ h'$, or their equivalents, arranged to run loose on a shaft, H, and in the same direction, and to mesh into two other corresponding bevel-wheels, $n\ n'$, or their equivalent, running loose on a pin, M, at right angles with the shaft H, and attached to it, as shown in figs. 2, 3, and 6, or to bearings on a wheel, N, turning about a shaft, L, as shown in figs. 4 and 5, the whole being held in place by collars on said shafts, or their equivalents, and constructed and arranged to operate substantially as described.

ROLLIN S. EDDY.

Witnesses:
  H. E. HUBBARD,
  HOWARD CRAMER.